3,536,816
WATER-IN-OIL EMULSION
Hans J. Kellner, Morris Plains, N.J., assignor to Atlas Chemical Industries, Inc., Wilmington, Del., a corporation of Delaware
No Drawing. Filed Sept. 30, 1964, Ser. No. 400,554
Int. Cl. A61k 7/00; A61j 3/04
U.S. Cl. 424—365                5 Claims

ABSTRACT OF THE DISCLOSURE

A water-in-oil emulsion vehicle for cosmetics and pharmaceuticals comprising a partial ester of glycerol and oleic acid, sorbitol and water in suitable proportions to form gels, creams, ointments and the like.

---

This invention relates to emulsion compositions. More particularly, this invention relates to nonionic water-in-oil emulsions suitable for the preparation of cosmetic, pharmaceutical and other products and to method for the preparation thereof.

Water-in-oil emulsions have value generally in the formulation of cosmetic and pharmaceutical ointments, emollient creams and the like. While water-in-oil emulsions impart desirable characteristics of water-repellency and adsorptive power for fats, oils and waxes when used in the formulation of lotions, ointments and creams to be used on the human skin, the use of such emulsions has sometimes been precluded because they have produced lotions, ointments and creams having one or more undesirable characteristics of toxicity, irritation to the skin and greasiness to the touch. Heretofore, a frequent disadvantage characteristic of nonionic water-in-oil emulsions has resided in their lack of stability which causes deterioration or separation of the formulated product.

It is, accordingly, an object of the present invention to provide a stable nonionic water-in-oil emulsion useful as a vehicle for cosmetic and pharmaceutical compositions which avoids the aforementioned disadvantages and at the same time provides compositions having outstanding characteristics of water-repellency and application properties.

It is another object of this invention to provide a water-in-oil emulsion suitable for use in the preparation of cosmetic and pharmaceutical products to be used in contact with the human skin which is non-toxic, non-irritating to the skin and which, although very water-repellent, can easily be removed with soap and water.

It is another object of this invention to provide a water-in-oil gel which may be used as a base in the formulation of cosmetic creams, emollients, lotions, ointments and the like.

It is another object of this invention to provide a water-in-oil emulsion gel which may be applied as a water repellent covering to human skin, which does not dry out, which remains substantially invisible thereon and which allows incorporated medicaments to act over a prolonged period of time on the surface thereof.

It is another object of this invention to provide a barrier gel suitable for use on human and animal skin and eyes and also in and around orifices of the human body.

It is another object of this invention to provide a water-in-oil emulsion useful in the formulation of cosmetics and medicaments which does not develop a disagreeable odor, a change in color, shrink or separate during storage.

It is another object of the present invention to provide a simple and economical method of preparing nonionic water-in-oil emulsions having the characteristics described above.

The foregoing objects and still further objects of the invention are achieved by blending a hexitol and water with a glyceryl partial ester of a fatty acid. The hexitol which is used in accordance with this invention is sorbitol and is preferably used in a form of aqueous solution thereof. The glyceryl partial ester which is used in accordance with this invention is a glyceryl partial ester of oleic acid. The glyceryl partial esters of oleic acid which are useful in the practice of the present invention are those which contain at least 35% of the monoester, i.e., at least 35% of glyceryl monooleate. In addition to sorbitol, water and oleic acid monoglyceride there may be also included in the emulsion composition a quantity of propylene glycol, if desired. Propylene glycol may be incorporated into the water-in-oil emulsion in amounts as high as about 16% without adversely affecting the stability of the emulsion.

The water-in-oil emulsions of the present invention may be prepared by blending the oleic acid monoglyceride and sorbitol and water and thereafter suitably agitating the blended mixture until an emulsion is formed. Most conveniently an aqueous solution of sorbitol is used. Although the oleic acid monoglyceride and the aqueous sorbitol solution may be blended in any manner as by adding either one to the other and subsequently agitating the mixture, it is preferred according to the present invention to add the aqueous sorbitol solution to the oleic acid monoglyceride and, hereafter, agitating the mixture until the water-in-oil emulsion is formed. In those cases in which it is desired to incorporate a quantity of propylene glycol into the emulsion, the propylene glycol is preferably added to the oleic acid monoglyceride prior to the blending of that component with the aqueous sorbitol solution.

One important and advantageous feature of the present invention resides in the fact that within appropriate ranges of percentage composition of the essential components of the water-in-oil emulsions of the present invention, the emulsions can be prepared in the form of translucent gels. Such gels are frequently deemed desirable in the formulation of particular cosmetic and pharmaceutical products and it has been found that the gels of the present invention are admirably suited to such purpose. It is emphasized, however, that the nonionic water-in-oil emulsions of the present invention are not restricted to those proportions of the components thereof which form gels; on the contrary, the water-in-oil emulsions of this invention comprise emulsions and the constitution of which vary over a wide range of viscosity and consistency.

In general, water-in-oil gels may be prepared in accordance with the method of this invention with the following essential components within the approximate ranges of parts by weight set forth below in Table I:

TABLE I

| Component: | Parts by weight |
|---|---|
| Glyceryl partial ester of oleic acid containing at least 35% by weight of glyceryl monooleate | 1 |
| Sorbitol | 1 to 17 |
| Water | 1 to 9 |

Although water-in-oil gels of the present invention may be prepared by simply mixing and agitating an aqueous solution of sorbitol and oleic acid monoglyceride in suitable proportions selected from the ranges of values given in Table I, it is preferred, in accordance with the method of the present invention, to add the aqueous solution of sorbitol to the oleic acid monoglyceride in small increments with constant agitation until a gel has formed; thereafter, the sorbitol solution may be added in larger amounts until a gel of the desired stiffness is obtained. It has been found that if a gel is to be obtained in accordance with the method of the present invention, practical limits on the concentration of the aqueous sorbitol solution are desirable. In general, gels may be formed according to the method of this invention by adding to the oleic acid monoglyceride an aqueous solution of sorbitol having a concentration of from about 30% sorbitol to about 70% sorbitol. A concentration of aqueous sorbitol solution in excess of about 70% sorbitol is impractical, since a greater concentration of sorbitol in water requires supersaturation; a concentration of less than about 30% sorbitol yields water-in-oil emulsions having a consistency more like that of a cream than of a gel. It has also been found that the practical limit of the ratio of weight of sorbitol and water to weight of oleic acid monoglyceride, if a gel is to be formed by admixture of those components, is about 2.3. An excessive amount of sorbitol and water added to the internal phase of the emulsion, will cause the gel structure to break.

It has also been found that gels formed by admixture and agitation of quantities of an aqueous solution of sorbitol with oleic acid monoglyceride within the proportions set forth in Table I may then, after such formation, be extended by the addition of water. The amount of water added in such circumstances to prepared gels may exceed the maximum limit for the ratio of water to oleic acid monoglyceride which is tolerable in the formation of the initial gel. It has been determined that water may be incorporated in such gels in amounts sufficiently great to yield a weight ratio of water to oleic acid monoglyceride as high as about 43. It will be evident, then, that the water-in-oil gels of the present invention may contain water in a ratio of oleic acid monoglyceride from as little as about 1:1 to about 43:1 by weight.

Without regard to gel formation, it has been empirically determined that water-in-oil emulsions of oleic acid monoglyceride, sorbitol and water may be obtained which contain in the interior phase thereof aqueous sorbitol solutions having a concentration as low as 5% by weight of sorbitol and as high as 70% by weight of sorbitol.

The following are representative examples of water-in-oil gels prepared in accordance with the method of this invention:

EXAMPLE 1

Parts by weight

| | |
|---|---|
| Glycerol monooleate (ca. 54% alpha monoglyceride) | 8.9 |
| Propylene glycol | 1.1 |
| Sorbitol | 63.0 |
| Water | 27.0 |

EXAMPLE 2

| | |
|---|---|
| Glycerol monooleate (ca. 54% alpha monoglyceride) | 4.0 |
| Sorbitol | 67.2 |
| Water | 28.8 |

EXAMPLE 3

| | |
|---|---|
| Glycerol monooleate (ca. 54% alpha monoglyceride) | 10.0 |
| Sorbitol | 39.1 |
| Water | 60.9 |

EXAMPLE 4

Parts by weight

| | |
|---|---|
| Glycerol monooleate (ca. 54% alpha monoglyceride) | 30.0 |
| Sorbitol | 49.0 |
| Water | 30.0 |

EXAMPLE 5

Parts by weight

| | |
|---|---|
| Glycerol monooleate (ca. 54% alpha monoglyceride) | 10.0 |
| Sorbitol | 10.0 |
| Water | 71.0 |

EXAMPLE 6

Parts by weight

| | |
|---|---|
| Glycerol monooleate (ca. 54% alpha monoglyceride) | 4.6 |
| Sorbitol | 7.5 |
| Water | 87.9 |

EXAMPLE 7

Parts by weight

| | |
|---|---|
| Glycerol monooleate (ca. 54% alpha monooleate) | 20 |
| Sorbitol | 13.4 |
| Water | 34.3 |

The following example illustrates the formulation of a representative cosmetic cream base using the water-in-oil gel base of the present invention:

EXAMPLE 8

| Component: | Percent by weight |
|---|---|
| Water-in-oil gel of Example 1 | 20 |
| Mineral oil | 20 |
| Ceresin wax | 2 |
| Beeswax | 2 |
| Water | 56 |
| Preservative, q.s. | |

Add the mineral oil, ceresin wax, and beeswax to the water-in-oil gel base. Heat the mixture to 70° C. Next, add the water at 72° C. Blend well by means of continuous mechanical agitation with a vessel-fitting blade to room temperature. Milling may be used to obtain maximum smoothness and stability.

The following example illustrates the formulation of a representative water-in-oil sunscreen cream using the gel base of the present invention:

EXAMPLE 9

| Component: | Percent by weight |
|---|---|
| Water-in-oil gel of Example 1 | 30 |
| Ceresin wax | 1 |
| Beeswax | 1 |
| Sunscreen agent | 3 to 10 |
| Water q.s. to, 100 | |

To the gel base add the ceresin wax, beeswax and sunscreen agent and heat the mixture to 70° C. Heat the water to 72° C. and add it to the mix, using mechanical agitation until cooled to room temperature. Homogenization or milling may be employed to obtain maximum smoothness and stability.

The following example illustrates a representative water-in-oil pigmented cosmetic make-up base using the water-in-oil gel base of the present invention:

EXAMPLE 10

| Component: | Percent by weight |
|---|---|
| Water-in-oil gel of Example 1 | 32 |
| Mineral oil | 10 |
| Beeswax | 1.5 |
| Ceresin wax | 1 |
| Titanium dioxide | 20 |
| Water | 35.5 |

Blend and heat together to 70° C. all the ingredients except the pigment and water. Mix to a uniform taste. Blend in the pigment and mix until uniformly dispersed. Heat the water to 72° C. and mix into the blend thoroughly, making sure all ingredients on the side of the vessel are included. Stir until cool. Mill or homogenize for maximum smoothness and stability.

The following example illustrates the formulation of a representative sulfur cream using the water-in-oil gel base of the present invention:

EXAMPLE 11

| Component: | Percent by weight |
| --- | --- |
| Cream base of Example 8 | 95 |
| Sulfur | 5 |

Mill the sulfur into the cream to obtain uniform distribution and smoothness. Viscosity and application properties may be adjusted as desired by changing the oil/wax ratio or changing the amount of oil/wax portion, adjusting the water phase proportionately.

The following example illustrates the formulation of a representative water-in-oil zinc oxide cream using the water-in-oil gel base of the present invention:

EXAMPLE 12

| Component: | Percent by weight |
| --- | --- |
| Water-in-oil gel of Example 1 | 30 |
| Beeswax | 1 |
| Ceresin wax | 1 |
| Mineral oil | 10 |
| Zinc oxide, U.S.P. | 20 |
| Water | 38 |

To the water-in-oil gel base add the mineral oil and waxes and heat to 70° C. Heat the water to 72° C. and mix into the blend until room temperature is reached, using a vessel-fitting type of blade. Milling may be employed to improve smoothness and shelf life.

The formula of Example 12 may be modified to include vitamin A or vitamin D alone, or combined. Antihistamines, analgesics, cod liver oil and Peru balsam are also compatible with the formula. Vitamin A palmitate (1 million U.S.P. units per gram) and vitamin D (Viosterol in oil, U.S.P.) have been added to the formula of Example 12 at level from 0.5% each (1.0% total) and the resulting cream has been found to have excellent physical stability to both heat and freeze-thaw cycles.

The following example illustrates the formulation of a water-in-oil calamine cream using the water-in-oil gel base of the present invention:

EXAMPLE 13

| Component: | Percent by weight |
| --- | --- |
| Water-in-oil gel of Example 1 | 30 |
| Beeswax | 1 |
| Ceresin wax | 1 |
| Mineral oil | 10 |
| Calamine, U.S.P. | 17 |
| Water | 41 |

Blend the oils and the waxes into the gel base and heat to 70° C. Add the calamine, with continuous mechanical agitation. Heat the water to 72° C. and add it to the blend, continuing agitation until cooled to room temperature. Milling may be employed for improved stability and shelf life.

It has been found in accordance with this invention that the water-in-oil emulsion thereof may advantageously be formed in situ while preparing the lotion, cream, ointment or other products into which it is desired to incorporate the emulsion. Accordingly, in an alternate method of preparation of such cosmetic and pharmaceutical products, the oleic acid monoglyceride and the aqueous sorbitol solution are each added separately to the total formulation of the product wherein, upon mixing and agitation, a water-in-oil emulsion base is formed in situ.

The following examples are typical of the method of forming the water-in-oil emulsion of the present invention in situ in the production of the final product:

EXAMPLE 14

| Component: | Percent by weight |
| --- | --- |
| Sorbitol solution (70% concentration) | 90 |
| Glyceryl monooleate (ca. 54% alpha monoglyceride) | 8 |
| Propylene glycol | 1 |
| Vitamin A | 0.5 |
| Vitamin D | 0.5 |
| Water | 37.0 |

EXAMPLE 15

| Component: | Percent by weight |
| --- | --- |
| Mineral oil | 12 |
| Paraffin wax | 10 |
| Glyceryl monooleate (ca. 54% alpha monoglyceride) | 3.6 |
| Propylene glycol | 0.4 |
| Sorbitol solution (70% concentration) | 36.0 |
| Methapyrilene fumarate | 0.5 |
| Paraoxime | 0.5 |
| Water | 37.0 |

In each of Examples 14 and 15 all the ingredients except water are blended together in a common vessel and heated to 70° C. Thereafter, the water is heated to 72° C. and slowly added to the blended mixture. The mixture is agitated until room temperature is reached.

It will be understood that the compositions of the present invention as described herein and defined in the claims which follow include those compositions containing the named ingredients in the proportions stated and any other ingredients which do not destroy the effectiveness of the compositions for the purposes stated in the specification, and, although this invention has been described with reference to specific materials and procedural steps, it will be apparent that still other equivalent and different materials be substituted for those described and procedural steps reversed and in some cases even eliminated, all within the spirit and scope of this invention as defined in the appended claims.

What is claimed is:

1. A water-in-oil emulsion having in the internal phase thereof from about 1 to about 17 parts by weight of sorbitol and from about 1 to about 43 parts by weight of water, said sorbitol and water taken together making a solution having a concentration of from about 5% to about 30% by weight of sorbitol and having in the external phase thereof about 1 part by weight of a partial ester of glycerol and oleic acid, at least about 35% of said partial ester consisting of the monoglyceride of oleic acid.

2. A water-in-oil gel containing about 1 part by weight of a partial ester of glycerol and oleic acid, at least about 35% of said partial ester consisting of the monoglyceride of oleic acid, from about 1 to about 17 parts by weight of sorbitol and from about 1 to about 43 parts by weight of water, said sorbitol and water together making a solution having a concentration of from about 5% to about 70% by weight of sorbitol and having a ratio by weight to said partial ester which is not less than about 2.3.

3. A water-in-oil gel containing about 1 part by weight of a partial ester of glycerol and oleic acid, at least about 35% of said partial ester consisting of the monoglyceride of oleic acid, from about 1 to about 17 parts by weight of sorbitol and from about 1 to about 9 parts by weight of water, said sorbitol and water together making a solution having a concentration of from about 30% to about 70% by weight of sorbitol and having a ratio by weight to said partial ester which is not less than about 2.3.

4. A process of preparing a water-in-oil gel base which comprises mixing together and agitating about 1 part by weight of a partial ester of glycerol and oleic acid, at least about 35% of said partial ester consisting of the monoglyceride of oleic acid, from about 1 to about 17 parts by weight of sorbitol and from about 1 to about 9 parts by weight of water, said sorbitol and water together making a solution having a concentration of sorbitol within the range of about 30% to about 70% by weight and having a ratio to said partial ester which is not less than about 2.3.

5. A process of preparing an extended water-in-oil gel wherein water is added to the gel defined in claim 4 to increase the water content thereof up to no more than about 43 parts by weight of said extended gel and wherein said sorbitol and water together in said extended gel comprise a solution having a concentration by weight of sorbitol within the range of about 5% to about 70%.

References Cited

UNITED STATES PATENTS 3,216,829   11/1965   Hansen _____ 99—118
2,895,879   7/1959   Brokaw _____ 424—344 X

OTHER REFERENCES

Atlas, Cosmetic and Pharmaceutical Bulletin, Atlas Chem. Ind. Wilmington, Del., October 1963, 4 pages.

Atlas Sorbitol, Atlas Chem. Ind., Wilmington, Del., November 1947, pages 1, 2, 3, 4 and 11.

ALBERT T. MEYERS, Primary Examiner

A. FAGELSON, Assistant Examiner

U.S. Cl. X.R.

252—308, 316; 424—172, 312

PO-1050
(5/69)

UNITED STATES PATENT OFFICE
CERTIFICATE OF CORRECTION

Patent No. 3,536,816                    Dated October 27, 1970

Inventor(s) Hans J. Kellner

It is certified that error appears in the above-identified patent and that said Letters Patent are hereby corrected as shown below:

Column 2, line 33 "hereafter" should read -- thereafter --

Column 4, Example 7, the figure in the first line should read "0.8" instead of -- 20 --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents